United States Patent [19]

Rieder et al.

[11] Patent Number: 5,117,376
[45] Date of Patent: May 26, 1992

[54] INCREMENTAL MEASURING SYSTEM

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 522,384

[22] Filed: May 11, 1990

[30] Foreign Application Priority Data

May 23, 1989 [AT] Austria .................... 1234/89

[51] Int. Cl.$^5$ ............................ G01B 21/00
[52] U.S. Cl. ................. 364/571.04; 364/561
[58] Field of Search .............. 341/6, 13, 118; 356/375; 364/560, 561, 571.04, 571.07

[56] References Cited

U.S. PATENT DOCUMENTS

| 2,336,550 | 12/1943 | Kruper | 356/319 |
| 2,985,826 | 5/1961 | Fluegel | 324/673 |
| 3,039,032 | 6/1962 | Fowler | 318/632 |
| 3,182,385 | 5/1965 | Esposito | 29/762 |
| 4,231,662 | 11/1980 | Feiland et al. | 356/375 X |
| 4,475,088 | 10/1984 | Beard | 328/134 X |
| 4,631,520 | 12/1986 | Wingate | 341/118 X |

FOREIGN PATENT DOCUMENTS

| 866402 | 2/1953 | Fed. Rep. of Germany . |
| 2724858 | 3/1979 | Fed. Rep. of Germany . |
| 407569 | 12/1963 | Switzerland . |
| 650334 | 10/1980 | Switzerland . |

Primary Examiner—Parshotam S. Lall
Assistant Examiner—Edward R. Cosimano
Attorney, Agent, or Firm—Collard, Roe & Galgano

[57] ABSTRACT

In an incremental measuring system a measuring scale provided on a scale member is scanned, periodic, basically sinusoidal analog measured-value signals are generated as a result of said scanning, and digital countable signals, which depend on the direction of the scanning movement, are derived from said analog measured-value signals and are delivered to evaluating means, such as indicating or control means. Electronic means are provided for correcting errors consisting at least of defects of the scale or of the positioning of the scale member in accordance with a stored or predetermined correction program. In order to avoid corrections resulting in large changes of the count and/or indication and to permit corrections to be effected in accordance with a correction curve which can be adapted or selected as desired to the requirements to be met by the measuring system, for a correction of an error the analog measured-value signals are combined in multiplier circuitry with correction factors in accordance with a previously stored correction program or in accordance with a predetermined correction function, which may be a linear function, whereby corrected analog signals are obtained, which have been placed in phase from the measured-value signals in steps amounting each to only a small fractional part of a complete period of said measured-value signals, and the corrected analog signals thus obtained are delivered to said digitalizing means.

14 Claims, 1 Drawing Sheet

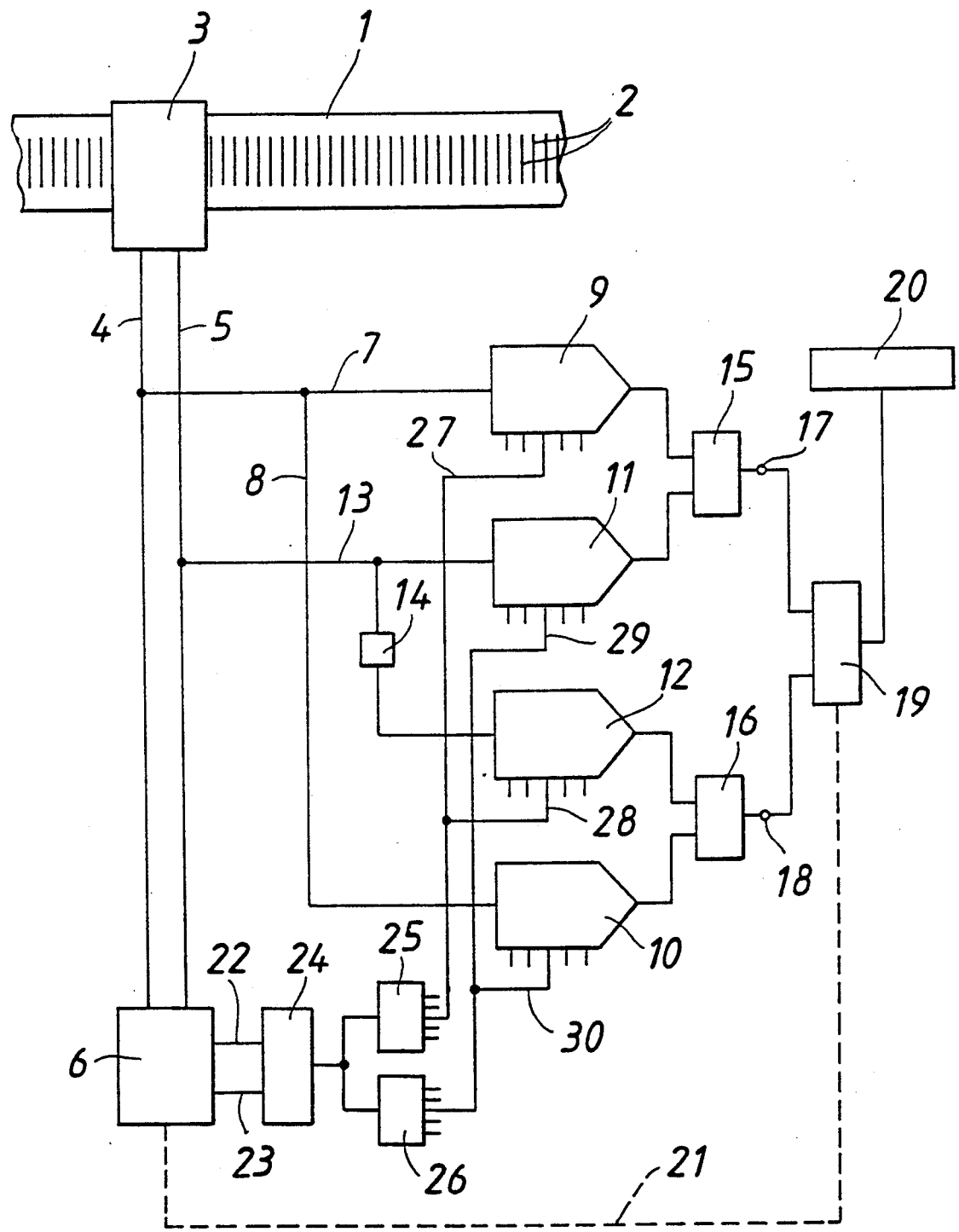

INCREMENTAL MEASURING SYSTEM

BACKGROUND OF THE INVETNION

1. Field of the Invention

This invention relates to an incremental measuring system, such as a system for measuring lengths, in which a measuring scale provided on a scale member is scanned, periodic, basically sinusoidal analog measured-value signals are generated as a result of said scanning, and digital countable signals, which depend on the direction of the scanning movement, are derived from said analog measured-value signals in digitalizing means, preferably by means of trigger and pulse-shaping stages, and are delivered to evaluating means, such as indicating or control means. Electronic means are provided for correcting errors consisting at least of defects of the scale or of the positioning of the scale member in accordance with a stored or predetermined correction program.

2. Description of the Prior Art

In the operation of incremental measuring systems of the kind outlined hereinbefore, a properly designed incremental scale is scanned by optoelectronic, capacitive, inductive or magnetic scanning methods. In most cases two measured-value signals, which are displaced 90° in phase, are delivered to the evaluating means and in most cases a period of the measured-value signals corresponds to an increment of the scale. If incremental scales are used which are optically or opto-electronically readable the measuring scale will preferably consist of bright and dark fields, which are equal in width and are scanned by means of scanning gratings, which have the same increments but are offset from each other by a fractional part of an increment, and by means of illuminating means and photoelectric receivers associated with said gratings. Four photoelectric receivers which are connected in pairs in a back-to-back connection are preferably used to generate two analog measured-value signals.

CH-A-407,569 discloses how the scale can be electronically subdivided by a dividing circuit, which comprises a potentiometer circuit and in which the zero crossings or the slope reversals of the analog measured-value signals appearing at several potentiometer taps are detected by the trigger stages. Dividing circuits are often used which multiply the number of measured-value signals by five so that a slope reversal of the square-wave measured-value signals will be effected at the several trigger stages at intervals of 18, with reference to the analog measured-value signal. The signals resulting from that division are logically combined to produce the digital countable signals, which are delivered to a counter operating a sense which depends on the direction of the scanning movement. The direction of the scanning movement can be detected because one or the other of the analog measured-value signals leads the other signal in dependence on the direction of the scanning movement.

Other means which are known for an electronic subdivision of the scale comprise circuits comprising interpolating computers or combinations of interpolating computers and counters.

Errors may occur in a measurement of lengths and angles and will adversely affect the result of the measurement, particularly in the case of measurements or of a control of machines at high accuracy, unless said errors are corrected. Position errors may often result from errors of the increments of the incremental scale or from errors in the mounting of a system for measuring lengths on an associated machine and/or from errors of the machine. Other errors, which in most cases are linear, may enter the measurement as a result of differential thermal expansion of a scale member which is provided with a longitudinal scale and a machine bed and as a result of a deviation of the scale from an exact parallelism relative to an associated track of a machine.

Known electronic correcting means comprise simple circuits, by which the count that is delivered to the indicating or control means is corrected by a value which is stored in a correction table for each count. A disadvantage of said methods resides in that the count will be suddenly changed for each correction by at least one countable step. In an extreme case, if a correction requires a reversal of the direction of movement and a repeated approach of the scanning unit to the point which is to be measured, a correction by a plurality of countable steps may be required at a correction point. Owing to said sudden changes of the count, a continuous counting is not possible and, as a result, an equivalent value (which has been obtained by a continual counting) will not be obtained for certain positions of the scanning unit. In machine controls which are provided with such correcting means that fact might result in severe disturbances in the operation. It is known that these disadvantages can be eliminated in that digital countable signals are suppressed or additional ones are introduced before the input of the counting stage, e.g., in the pulse-shaping stage. But even in that case there will be sudden changes at the correction points and will result in measurement errors at least of an order of that fractional part of a scale increment which corresponds to one or more countable steps. A correction in dependence on stored correcting values and with the aid of an interpolating computer will require the system for measuring lengths to include a suitable computer and nevertheless may result in inaccuracies.

As has been mentioned hereinbefore, most electronic correcting methods used in practice involve inaccuracies of an order of a length or angle which is associated with at least one countable step and correspondingly large changes of the count must often be tolerated. For this reason, mechanical correcting means have previously been preferred where measurements and corrections of high accuracy were required. Those means are based on the principle that the scanning unit or the scanning grating of the scanning unit is adjusted by correcting drives in the direction of the scanning movement relative to the coupling member provided for displacing the scanning unit. The correcting drives scan correcting templates, which are accommodated in a housing that contains the scale member and are individually adjustable and in response to the scanning of said templates the correcting drives advance or retract the scanning unit or the scanning grating relative to that coupling member. Such correcting methods and correcting means are known from DE-C-866,402 and from U.S. Pat. Nos. 3,039,032; 3,182,385; 2,336,550; and 2,985,826. In accordance with German Patent Specification 2,724,858 the scannable correcting template is constituted by a link chain, which is mounted to extend along the scale member and which at its articulated joints is adjustable by eccentrics, which are operable from the outside. In the mechanical correcting methods which have been described, an infinite correction can be effected in each portion of the scale whereas the known electronic correcting means can effect only a stepwise correction. The corrections which may be effected by the mechanical correcting methods are limited by the extent to which the scanning unit or the grating can be adjusted relative to the coupling member, particularly in the case of substantial linear errors, and by the spacing of the points at which the correcting template can be adjusted. The mechanical correction involves a very high expenditure and requires the use of a much larger housing for the measuring system and of a relatively large scanning unit, which must be provided with the required correcting drives and must have a relatively heavy weight, and the mechanical correction cannot be effected unless the measuring system has inherently been designed for a performance of such mechanical corrections. In case of linear scale errors of metal scale members a continuous correction can be effected in that the scale member is elongated or upset. But that practice also involves a considerable expenditure and a severe restriction regarding the design of the measuring system.

SUMMARY OF THE INVENTION

It is an object of the invention to provide a measuring system which is of the kind described first hereinbefore and in which electronic corrections can be effected with simple means in case of need and will require a mechanical adjustment of the scale member or of the scanning unit and will not result in an occurrence of stepwise count changes or equivalent errors in measurement at the correction points whereas an almost stepless correction curve will be obtained, the extent of the possible correction will not be limited and the corrections can freely be programmed if this is required.

The object set forth is accomplished in that for a correction of an error the analog measured-value signals are combined in multiplier circuitry with correction factors in accordance with a previously stored correction program or in accordance with a predetermined correction function, which may be a linear function, whereby corrected analog signals are obtained, which have been displaced in phase from the measured-value signals in steps amounting each to only a small fractional part of a complete period of said measured-value signals, and the corrected analog signals thus obtained are delivered to said digitalizing means.

In the system in accordance with the invention the correcting means may be externally mounted and the corrected analog signals delivered by the correcting means will be digitalized and evaluated like the sinusoidal analog measured-value signals which are delivered by the scanning unit in the usual systems. It will be understood that in the system in accordance with the invention the multiplier circuitry may replace the preamplifiers which are otherwise usually provided. The corrected analog signals may be processed in the manner which is usual for measuring systems of a given type. For instance, an electronic subdivision of the scale may be effected in that the corrected analog signals are processed by means of iterative dividing circuits or by interpolating computers. In both cases the phase displacement effected by a correcting step will be smaller than each of the digital countable steps which are obtained as a result of the electronic subdivision of the scale. If interpolating computers are obtained, parts of the computer circuit may be used in part for a control of the correcting means. Alternatively, the correcting means, on the one hand, and the digitalizing and evaluating means, on the other hand, may be entirely separate from each other. As has been stated hereinbefore, the actual correction will be effected in steps which correspond each to only a fractional part of a countable step. If suitable multiplier circuitry is provided, a stepless change of the phase displacement from one correcting step to the next may be effected. The multiplier circuitry may be controlled in synchronism with the counter of the evaluating means so that the interval of time between the counting step and the correcting step will be predetermined and counting errors will be avoided. Because each correction will be effected in steps amounting each to a fractional part of a countable step, the correction will have an accuracy which is comparable to the accuracy which can be achieved with the known mechanical correcting methods or may even be superior thereto and the advantage will be afforded that the correction curve can be adapted to any error curve by a suitable programming. By means of the correcting means in accordance with the invention, a desired correction curve can be changed in that the phase displacement is changed by a change of the multiplication factor. Suitable electronic measures may be adopted in order to permit an overall correction to be effected to any desired extent so that the sum of all corrections in each direction may amount to a multiple of a scale increment. Suitable circuitry may be provided, which permits the multipliers to be used for effecting phase displacements in both directions to a total extent which is not in excess of a complete scale increment and to initiate further corrections at zero correction. Correcting means which serve to displace the analog measured-value signal in phase in very small steps but permit corrections to be effected in both directions by a multiple of a scale increment comprise multipliers consisting of four-quadrant multipliers, which have digital inputs that are connected to the outputs of correcting signal generating means comprising a bidirectional ring counter comprising counting stages which are equal in number to the correcting steps required to effect a phase displacement by a complete period of each analog measured-value signal, which counter is operable to perform counting steps in a number which is controlled in accordance with the correction program. For instance, if four-quadrant multipliers are used in that circuit which have an analog input for receiving the analog measured-value signals, an output for delivering the corrected analog signals, and ten digital inputs, which are connected to a 10-bit ring counter, it will be possible to effect a phase displacement in steps of an order of 1/1024 of a period of the analog measured-value signal. In conventional dividing circuits comprising iterative dividing circuits, a scale increment may electronically be subdivided with a ratio of an order of 1/10 to 1/20 of and a ratio of an order of 1/100 may be achieved with interpolating computers. The ring counter is controlled by the control unit and by its current count will determine the current multiplication factor and the resulting phase displacement. A complete cycle of the ring counter in one sense will result in a total correction which is equal to one scale increment so that the corrected analog signal which is delivered to the evaluating means will be shorter or longer, in dependence on the sense in which the counter has counted, by a complete signal period than the uncorrected measured-value signals which have been generated in response to the scanning. Errors due to linear scale defects may be corrected in a simple manner in that a control signal is delivered to the ring counter whenever an absolute-value counter has performed n counting steps. That absolute-value counter is associated with the scale in such a manner that the count of the absolute-value counter depends on the uncorrected distance from an origin of the scale to the current location at which the scale is scanned. As a result of said control signal the ring counter performs a forward or reverse counting step and controls the multiplier circuitry so as to effect a correcsponding phase displacement of its output signal. The correcting means may comprise programmable memories, which are associated with the scale and serve to define a selectable correction curve, or preprogrammed memories for storing a given correction curve. In the latter case the correction curve is established as the measuring system is calibrated with reference to a higher-ranking measuring system, which has a higher resolution and a higher accuracy and may consist, e.g., of a laser interferometer, and the correction curve thus obtained may be stored in read-only memories. For a correction of the ellipse and phase errors occurring in the operation of synchros, the ring counter may be synchronized with the revolutions of the synchro so that the periodic signal displacements resulting from said errors may be compensated and the accuracy of the measurement can thus be improved.

In a preferred embodiment the counter is coupled by matching circuits to the multiplier circuitry for generating the corrected analog signals. Said matching circuits operate in dependence on the relative phase positions of the analog measured-value signals. As a result, where four-quadrant multipliers are employed it will be necessary that the binary value which is applied to the digital inputs of the multipliers for the sine signal differs from the binary value that is applied to the digital inputs of the multiplier for the cosine signal so that the two signals will be displaced in phase in the same sense by the same amount. This is ensured by the provision of said matching circuits, which will also permit of the use of a single ring counter.

In a preferred embodiment, the matching circuits include programmable read-only memories (PROM's), in which binary multiplication factors are stored, which are associated with and equivalent to respective counts of the ring counter and will cause the analog measured-value signals to be corrected by the phase displacement corresponding to said factor. That multiplication factor will preferably consist of sine and cosine values and will be applied to the associated multipliers in response to the ring counter reaching the associated count.

A further advantage afforded by the provision of matching circuits resides in that any unbalance in the analog measured-value signals originally obtained, such as a wrong phase relation, may be compensated by a suitable adjustment of properly designed matching circuits so that phase errors may also be corrected.

A circuit arrangement which has proved satisfactory in practice will process two analog measured-value signals having a phase displacement of, e.g., 90°, in that one measured-value signal is inverted and the other is doubled so that four derived signals at relative phase positions of 0°, 90°, 270° and 360°, respectively, are fed to respective multipliers, the corrected analog signals for 0° and 90° and for 270° and 360° are respectively combined in summing stages, which generate two corrected analog output signals, which are displaced 90° in phase and are delivered to the digitalizing means.

That signal processing will eliminate errors. Because the corrected signals are combined in pairs, the multipliers may be operated with different, adjustable gains, which are used to effect a phase displacement so that the phase displacement may be controlled by the gain.

BRIEF DESCRIPTION OF THE DRAWING

The drawing is a simplified block circuit diagram showing a system for measuring lengths.

DETAILED DESCRIPTION OF THE PREFERRED EMBODIMENT

Further details and advantages of the invention will become apparent from the following detailed description of the drawing.

A scale member 1 is preferably encapsulated in an enclosure and provided with a measuring scale 2, which consists of bright and dark fields arranged in alternation. A scanning unit 3 is movable along the scale member 1 by means of a coupling member. The scanning unit 3 comprises photoelectric receivers, which are illuminated through the scale and through scanning gratings, which are offset from each other by a fractional part of an increment of the scale. Analog measured-value signals, which are displaced in phase relative to each other, appear at the outputs of the photoelectric receivers. Two analog measured-value signals, which are displaced 90° in phase are delivered to the leads 4 and 5, respectively, and may alternatively be generated by two pairs of scanning units, each pair of which constitutes a back-to-back connection.

The analog measured-value signals are delivered to a correction control unit 6 and to means for their further processing. For the latter purpose, the sine signal from line 4 is delivered via leads 7, 8 to two four-quadrant multipliers 9, 10 and the cosine signal from line 5 is delivered via leads 13 directly to a four-quadrant multiplier 11 and via an inverter 14 to a further four-quadrant multiplier 12. As a result, signals having relative phase positions of 0°, 90°, 270° and 360° (=0°) are respectively delivered to the four-quadrant multipliers 9, 11, 12 and 10, in that order. The four-quadrant multipliers 9, 10, 11 and 12 may be of the type illustrated and described in FIG. 7, entitled Bipolar 4-Quadrant Multiplying Configuration, of Linear Databook 2, 1988 Edition, published by National Semiconductor Corporation.

The outputs of the multipliers 9, 11 and those of the multipliers 10 and 12 are delivered to summing stages 15 and 16, respectively, which at their outputs 17, 18 deliver two corrected analog signals, which are displaced 90° in phase from each other and are delivered to digitalizing means 19, such as evaluating means, which comprise dividing stages, trigger and pulse-shaping stages, which are succeeded by evaluating means 20 comprising counters and indicating means. The evaluating means may include an interpolating computer and memory and counting means associated therewith. In the digitalizing means the signals coming from the terminals 17, 18 are processed in the same manner as the signals coming from the lines 4 and 5 would otherwise be processed although the provision of the multipliers 9 to 12 eliminates the need for a preamplifier stage in the digitalizing means.

The correction control circuit 6 may comprise an absolute-value counter, i.e., a bidirectional counter which by its instantaneous count indicates the number of scale increments disposed between an origin on the scale, such as a reference mark, and the scale increment which is currently scanned by the scanning unit 3. In dependence on a predetermined correction curve, the control circuit initiates corrections at predetermined locations of the scale. In case of linear scale errors, such corrections may be initiated in the simplest case by means of a dividing circuit, which generates a correction-initiating signal whenever said absolute-valve counter has performed n counting steps. Alternatively, corrections may be initiated by means of programmable or preprogrammed memories, which are queried by control means, such as a microcomputer, so that a correction will be initiated whenever the absolute-value counter has reached any of a number of predetermined counts. As is indicated by a lead 21, the correction control means 6 may be synchronized with the digitalizing means 19 and a microcomputer which is included in the digitalizing means 19, e.g., as an interpolating computer may additionally be used for the correction control means 6.

A correction may be required by which the length of the measuring scale 2 is increased or decreased and the sign of the correction-initiating signal will depend on the sense of the required correction. For this reason the correction-initiating signals provided with the proper signs will be delivered via leads 22, 23 as incrementing or decrementing countable signals to a ring counter 24, which has counting stages in a number which is equal to the number of correcting steps which will be required to provide corrected analog signals which appear at the terminals 17, 18 and have been displaced in phase by a complete period. The output of the counter 24 is connected to two matching circuits 25, 26. The matching circuit 25 is connected by leads 27, 28 to the digital inputs of the multipliers 9 and 12, which receive the sine signal and the inverted cosine signal, respectively. The matching circuit 25 is connected by leads 29, 30 to the digital inputs of the multipliers 10 and 11. The matching circuits 25, 26 may include programmable read-only memories (PROM's), in which multiplication factors are stored, which are associated with and equivalent to respective counts of the ring counter 24 and which ensure that the corrected output signal will have been displaced in phase to the desired extent. That multiplication factor may consist of the sine value or the cosine value which is associated with the angle of the phase displacement which is associated with the count. In dependence on the instantaneous count of the ring counter 24, said factors are applied to the associated multipliers 9, 12 and 10, 11. Any change of the count by one step will result in a change of the multiplication factor applied to the multipliers 9 to 12, and, as a result, in a change of the amplitude of the output signal of each multiplier. Because the outputs of the multipliers 9, 10 and 10, 12 are combined in pairs, the change of the amplitude is utilized for a change of the relative phase positions of the corrected signals appearing on 17, 18, on the hand, and the signals appearing on the lines 4, 5, on the other hand. Unless a correction is effected, a constant phase displacement of 45° will be maintained between the corrected signals appearing on 17, 18 and the signals appearing on 4, 5. If a ring counter 24 for 10 bits is used, each of the multipliers 9 to 12 which are employed will have ten digital inputs so that one counting step of the counter 24 will change the phase position of the corrected analog signals by 1/1024 of a complete period of the analog signal. Phase errors of the measured-value signals may also be corrected by an adjustment of the matching circuits 25, 26 relative to each other.

The correcting circuitry which has been illustrated for use with a linear measuring system may be used with the same circuit arrangement for systems for measuring angles, in which an angle scale provided on a disk-shaped scale member is scanned rather than the linear scale 2.

We claim:
1. In an incremental measuring system comprising
   a scale member provided with an incremental scale,
   a scanning unit, which is operable to perform relative to said scale member a scanning movement along said scale and to scan said scale and in response to said scanning to generate basically sinusoidal analog measured-value signals,
   digitalizing means for deriving from said measured-value signals digital countable signals depending on the direction of said scanning movement,
   evaluating means for receiving and evaluating said countable signals, and
   electronic correcting means for correcting said analog measured-value signals in accordance with a correction program,
   the improvement residing in that
   said correcting means comprise multiplier circuitry for receiving and processing said analog measured-value signals and for delivering corrected analog signals to said evaluating means, and
   program-controlled means for generating correcting signals in accordance with said program and for delivering said correcting signals to said multiplier circuits, wherein
   said multiplier circuitry is operable to effect in response to said correcting signals a phase displacement of said measured-value signals in correcting steps amounting each to only a fractional part of a period of said measured-value signals and in a number determined by said correcting signals.

2. The improvement set forth in claim 1 as applied to a measuring system in which said scale consists of a plurality of scale increments and said scanning unit is operable to generate said measured-value signals having a period corresponding to one said scale increments.

3. The improvement set forth in claim 1 as applied to a measuring system in which said evaluating means comprises indicating means.

4. The improvement set forth in claim 1 as applied to a measuring system in which said evaluating means comprise controlling means.

5. The improvement set forth in claim 1 as applied to a measuring system in which said correcting means are operable to correct said measured-value signals in order to eliminate errors which are due to defects of said incremental scale.

6. The improvement set forth in claim 1 as applied to a measuring system in which said correcting means are operable to correct said measured-value signals in accordance with a predetermined correction program.

7. The improvement set forth in claim 1 as applied to a measuring system in which said scanning unit is operable to generate at least two of said measured-value signals having the same frequency,
   said multiplier circuitry comprises a plurality of four-quadrant multipliers, each of which has an analog input connected to receive one of said measured-value signals, an analog output for delivering one of said corrected analog signals to said digitalizing means, and a plurality of digital inputs connected to receive said correcting signals, and said program-controlled means comprise a bi-directional ring counter, which is operable to control the generation of said correcting signals in dependence on said correction program and comprises a plurality of counter stages equal in number to said correcting steps required for a correction amounting to said period of said measured-value signals.

8. The improvement set forth in claim 1, as applied to a measuring system in which said scanning unit is operable to generate at least two of said measured-value signals, which are displaced in phase from each other, wherein said multiplier circuitry comprises a plurality of multipliers, each of which has an analog input connected to receive one of said measured-value signals, an analog output connected to deliver one of said corrected analog signals to said digitalizing means, and a correcting input connected to receive said correcting signals, said ring counter is connected to said multipliers by matching circuits for generating a plurality of said correcting signals and for delivering respective ones of said correcting signals to said multipliers with a timing which corresponds to the relative phase displacement of said measured-value signals delivered to said multipliers.

9. The improvement set forth in claim 8, wherein means are provided for adusting said matching circuits for a compensation of phase errors of said measured-value signals.

10. The improvement set forth in claim 8, wherein each of said multipliers consists of a four-quadrant multiplier, which has an analog input connected to receive one of said measured-value signals, an analog output for delivering one of said corrected analog signals to said digitalizing means, and a plurality of digital inputs connected to receive said correcting signals, said program-controlled means comprise a bi-directional ring counter, which is operable to control the generation of said correcting signals in dependence on said correction program and comprises a plurality of counter stages equal in number to said correcting steps required for a correction amounting to said period of said measured-value signals, each of said matching circuits comprises a programmable read-only memory, in which binary multiplication factors are stored, which are associated with respective counts of said ring counter and each of which has a magnitude which is equivalent to a phase displacement which is to be effected in said measured-value signals in response to said associated count, and said matching circuits are operable to deliver correcting signals equivalent to said multiplication factors to said multipliers in response to said counts of said ring counter.

11. The improvement set forth in claim 10 as applied to a measuring system in which said scanning unit is operable to generate said measured-value signals which consist of a sine signals and a cosine signals, wherein one of said matching circuits comprises a prgrammable read-only memory, in which binary multiplication factors are stored, which consist of sine values and are associated with respective counts of said ring counter and each of which has a magnitude which is equivalent to a phase displacement which is to be effected in said sine signal in response to said associated count, another one of said matching circuits comprises a programmable read-only memory, in which binary multiplication factors are stored, which consist of cosine values and are associated with respective counts of said ring counter and each of which has a magnitude which is equivalent to a phase displacement which is to be effected in said cosine signal in response to said associated count, at least one of said multipliers is connected to receive said analog sine signal at its analog input and said correcting signals representing said sine values at its digital inputs and at least one other of said multipliers is connected to receive said analog cosine signal at its analog input and said correcting signals representing said cosine values at its digital input.

12. The improvement set forth in claim 8 as applied to a measuring system in which said scanning unit is operable to generate first and second ones of said analog measured-value signals, wwhich are displaced in phase relative to each other, wherein said multiplier circuitry comprises signal-deriving means, which are connected to receive said analog measured-value signals and to generate four derived analog signals having relative phase positions of 0°, 90°, 270° and 360°, respectively, said multiplier circuitry comprises first, second, third and fourth multipliers, each of which is connected to receive said correcting signals, said first, second, third and fourth multipliers are connected to receive said derived analog signals having relative phase positions of 0°, 90°, 270° and 360°, respectively, each of said multipliers is operable to effect in response to said correcting signals a phase displacement of one of said modified analog signals in correcting steps amounting each to only a fractional part of a period of said derived analog signal and to generate a corrected intermediate analog signal as a result of said phase displacement, a first summing stage is provided, which is connected to receive said corrected intermediate analong signals from said first and second multipliers and to generate a first corrected analog signal, a second summing stage is provided, which is connected to receive said corrected intermediate analong signals from said third and fourth multipliers and to generate a second corrected analog signals, which is displaced 90° in phase from said first corrected analog signal, and said digitalizing means are connected to receive said first and second corrected analog signals from said first and second summing stages, respectively.

13. The improvement set foth in claim 12, as applied to a measuring system in which said scanning unit is operable to generate first and second ones of said analog measured-value signals, which are displaced 90° in phase relative to each other.

14. The improvement set forth in claim 12, wherein said signal-modifying means are operable to deliver said first analog-measured value signal as one of said second and third derived analog signals, to invert said first analog measured-value signal and to deliver said inverted signal as the other one of said second and third derived analog signals, and to deliver said second analog measured-value signal as said first and fourth derived analog signals.

* * * * *